UNITED STATES PATENT OFFICE.

FRITZ HOFMANN AND KONRAD DELBRÜCK, OF ELBERFELD, AND KURT MEISENBURG, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING PINACONES.

1,039,740.  Specification of Letters Patent.  Patented Oct. 1, 1912.

No Drawing. Original application filed February 28, 1911, Serial No. 611,374. Divided and this application filed June 1, 1911. Serial No. 630,637.

*To all whom it may concern:*

Be it known that we, FRITZ HOFMANN and KONRAD DELBRÜCK, residing at Elberfeld, and KURT MEISENBURG, residing at Leverkusen, near Cologne, Germany, doctors of philosophy, chemists, citizens of the German Empire, have invented new and useful Improvements in Processes of Producing Pinacones, of which the following is a specification.

The present application is a divisional application from our application No. 611,374.

We have found that toluene can be substituted for the acetone of crystallization in the process for reducing acetone to pinacone with the aid of magnesium and mercuric chlorid. The use of an excess of acetone, part of which suffers disagreeable changes by the reaction, is thus rendered superfluous.

In order to illustrate the new process more fully the following example is given, the parts being by weight:—200 grams of a 10 per cent. sublimate-acetone solution are added to 100 grams of magnesium metal; to this violently reacting mixture, a mixture of 300 grams of acetone with 600 grams of toluene is added and then 800 grams of toluene. When the reaction is complete, the organo-magnesium compound is decomposed by the addition of 125 grams of water, the metallic precipitate consisting mainly of a mixture of mercury and magnesium oxid is removed by filtration and the pinacone is precipitated from the toluene solution as its hydrate by the addition of 300 grams of water.

In the foregoing process the mercuric chlorid and metallic magnesium react to form magnesium amalgam, the latter reagent being thus formed during the reaction.

We claim:—

1. Process of producing a pinacone from a ketone which comprises treating such ketone with magnesium amalgam in the presence of toluene as a non-reactive diluent.

2. Process of producing a pinacone from acetone which comprises treating acetone with magnesium amalgam in the presence of toluene as a non-reactive diluent.

3. Process of producing a pinacone from a ketone which comprises treating such ketone with mercuric chlorid and metallic magnesium in the presence of toluene as a non-reactive diluent.

4. Process of producing pinacone from acetone which comprises treating acetone with mercuric chlorid and metallic magnesium in the presence of toluene as a non-reactive diluent.

5. Process of producing pinacone from acetone which consists in treating 2 molecules of acetone with mercuric chlorid and 1 molecule of magnesium in the presence of toluene as a non-reactive diluent, decomposing the organic magnesium compound thus produced and finally isolating the pinacone, substantially as described.

In testimony whereof we have hereunto set our hands in the presence of two subscribing witnesses.

FRITZ HOFMANN. [L. S.]
KONRAD DELBRÜCK. [L. S.]
KURT MEISENBURG. [L. S.]

Witnesses:
ALBERT F. NUFER,
ALFRED HENKEL.